US00RE41100E

(19) United States
(12) Reissued Patent
Maziasz et al.

(10) Patent Number: US RE41,100 E
(45) Date of Reissued Patent: Feb. 9, 2010

(54) HEAT AND CORROSION RESISTANT CAST CN-12 TYPE STAINLESS STEEL WITH IMPROVED HIGH TEMPERATURE STRENGTH AND DUCTILITY

(75) Inventors: Philip J. Maziasz, Oak Ridge, TN (US); Tim McGreevy, Washington, IL (US); Michael James Pollard, Peoria, IL (US); Chad W. Siebenaler, Dunlap, IL (US); Robert W. Swindeman, Oak Ridge, TN (US)

(73) Assignee: Caterpillar Inc., Peoria, IL (US)

(21) Appl. No.: 12/230,257

(22) Filed: Aug. 26, 2008

Related U.S. Patent Documents

Reissue of:
(64) Patent No.: 7,255,755
Issued: Aug. 14, 2007
Appl. No.: 10/195,703
Filed: Jul. 15, 2002

U.S. Applications:
(63) Continuation-in-part of application No. 09/736,741, filed on Dec. 14, 2000, now abandoned.

(51) Int. Cl.
*C22C 38/58* (2006.01)

(52) U.S. Cl. ..... 148/327; 420/44
(58) Field of Classification Search ..... None
See application file for complete search history.

(56) References Cited

U.S. PATENT DOCUMENTS

| | | | |
|---|---|---|---|
| 2,602,738 | A | 7/1952 | Jennings |
| 2,671,726 | A | 3/1954 | Jennings |
| 2,696,433 | A | 12/1954 | Tanczyn |
| 2,892,703 | A | 6/1959 | Furman et al. |
| 3,969,109 | A | 7/1976 | Tanczyn |
| 4,299,623 | A | 11/1981 | Azbukin et al. |
| 4,560,408 | A | 12/1985 | Wilhelmsson |
| 4,675,156 | A | 6/1987 | Sakamoto et al. |
| 4,929,419 | A | 5/1990 | Wegman et al. |
| 5,147,475 | A | 9/1992 | Holmberg |
| 5,340,534 | A | 8/1994 | Magee |
| 5,525,167 | A | 6/1996 | McVicker |
| 5,536,335 | A | 7/1996 | Burris |
| 5,595,614 | A | 1/1997 | McVicker |
| 5,824,264 | A | 10/1998 | Uno et al. |
| 5,910,223 | A | 6/1999 | Tipton et al. |
| 6,033,626 | A | 3/2000 | Takahashi |

FOREIGN PATENT DOCUMENTS

| | | |
|---|---|---|
| CH | 313006 | 3/1956 |
| EP | 0340631 A1 | 11/1989 |
| EP | 0467756 A1 | 1/1992 |
| EP | 0668367 A1 | 8/1995 |
| GB | 1061511 | 3/1967 |

OTHER PUBLICATIONS

Davis, J.R., "High–Alloy Cast Steels, " ASM Specialty Handbook (Heat–Resistant Materials) (1997), pp. 200–202.
Davis, J.R., "Metallurgy and Properties of Cast Stainless Steels, " ASM Specialty Handbook (Stainless Steels) 1994, pp. 66–88.
Chen et al., "Development of the 6.8L V10 Heat Resisting Cast–Steel Exhaust Manifold, " SAW Technical Paper Series (Oct. 14–16, 1996), pp. 57–64.
Search report from EPO for corresponding Application No. EP0112492 dated Feb. 27, 2003 ( 3 pages).

*Primary Examiner*—Roy King
*Assistant Examiner*—Jie Yang
(74) *Attorney, Agent, or Firm*—Finnegan Henderson, Farabow, Garrett & Dunner

(57) ABSTRACT

A cast stainless steel alloy and articles formed therefrom containing about 0.5 wt. % to about 10 wt. % manganese, 0.02 wt. % to 0.50 wt. % N, and less than 0.15 wt. % sulfur provides high temperature strength both in the matrix and at the grain boundaries without reducing ductility due to cracking along boundaries with continuous or nearly-continuous carbides. Alloys of the present invention also have increased nitrogen solubility thereby enhancing strength at all temperatures because nitride precipitates or nitrogen porosity during casting are not observed. The solubility of nitrogen is dramatically enhanced by the presence of manganese, which also retains or improves the solubility of carbon thereby providing additional solid solution strengthening due to the presence of manganese and nitrogen, and combined carbon. Such solution strengthening enhances the high temperature precipitation-strengthening benefits of fine dispersions of NbC. Such solid solution effects also enhance the stability of the austenite matrix from resistance to excess sigma phase or chrome carbide formation at higher service temperatures. The presence of sulfides is substantially eliminated.

27 Claims, No Drawings

HEAT AND CORROSION RESISTANT CAST CN-12 TYPE STAINLESS STEEL WITH IMPROVED HIGH TEMPERATURE STRENGTH AND DUCTILITY

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of U.S. patent application Ser. No. 09/736,741 filed Dec. 14, 2000, the disclosure of which is incorporated by reference herein.

This invention was made with U.S. Government support under U.S. Department of Energy Contract No.: DE-AC05-960R2264 awarded by the U.S. Department of Energy. The U.S. Government has certain rights in this invention.

TECHNICAL FIELD

This invention relates generally to cast steel alloys of the CN-12 types with improved strength and ductility at high temperatures. More particularly, this invention relates to CN-12 stainless steel alloys and articles made therefrom having excellent high temperature strength, creep resistance and aging resistance, with reduced niobium carbides, manganese sulfides, and chrome carbides along grain and substructure boundaries.

BACKGROUND

There is a need for high strength, oxidation resistant and crack resistant cast alloys for use in internal combustion engine components such as exhaust manifolds and turbocharger housings and gas-turbine engine components such as combustor housings as well as other components that must function in extreme environments for prolonged periods of time. The need for improved high strength, oxidation resistant, crack resistant cast alloys arises from the desire to increase operating temperatures of diesel engines, gasoline engines, and gas-turbine engines in effort of increasing fuel efficiency and the desire to increase the warranted operating hours or miles for diesel engines, gasoline engines and gas-turbine engines.

Current materials used for applications such as exhaust manifolds, turbo-charger housings, and combustor housings are limited by oxidation and corrosion resistance as well as by strength at high temperatures and detrimental effects of aging. Specifically, current exhaust manifold materials, such as high silicon and molybdenum cast ductile iron (Hi—Si—Mo) and austenitic ductile iron (Ni-resist) must be replaced by cast stainless steels when used for more severe applications such as higher operating temperatures or when longer operating lifetimes are demanded due to increased warranty coverage. The currently commercially available cast stainless steels include ferritic stainless steels such as NHSR-F5N or austenitic stainless steels such as NHSR-A3N, CF8C and CN-12. However, these currently-available cast stainless steels are deficient in terms of tensile and creep strength at temperatures exceeding 600° C., do not provide adequate cyclic oxidation resistance for temperatures exceeding 700° C., do not provide sufficient room temperature ductility either as-cast or after service exposure and aging, do not have the requisite long-term stability of the original microstructure and lack long-term resistance to cracking during severe thermal cycling.

Currently, the corrosion-resistant grade of cast austenitic stainless steel, CN-12, is in commercial use for automotive applications but is not optimized for extended service applications (e.g. diesel applications). CN-12 provides adequate strength and aesthetics for automobiles for the anticipated life in comparison to cast iron, but lacks the improved creep resistance that is optimal when mounting turbo chargers (70 lbs.) onto diesel exhaust manifolds. Currently commercially available CN-12 austenitic stainless steel includes about 25 wt. % chromium, 13 wt. % nickel, smaller amounts of carbon, nitrogen, niobium, silicon, manganese, molybdenum and sulfur. The addition of sulfur is considered essential or desirable for machineability from the cast material. The amount of added sulfur ranges from 0.11 wt. % to 0.15 wt. %.

It is therefore desirable to have a steel alloy and articles made from a steel alloy that have improved strength at high temperatures and improved ductility for engine component applications requiring severe thermal cycling, high operation temperatures and extended warranty coverage.

SUMMARY OF THE INVENTION

The present invention may be characterized as a heat resistant and cast, corrosion resistant austenitic stainless steel alloy. In particular, the heat resistant and cast, corrosion resistant austenitic stainless steel alloy comprises from about 0.2 weight percent to about 0.5 weight percent carbon, from about 2.0 weight percent to about 10 weight percent manganese; and less than about 0.03 weight percent sulfur.

In another aspect, the invention may also be characterized as a heat resistant and cast, corrosion resistant austenitic stainless steel alloy comprising from about 18.0 weight percent to about 25.0 weight percent chromium and 12.0 weight percent to about 20.0 weight percent nickel, from about 0.2 weight percent to about 0.5 weight percent carbon, from about 2.0 weight percent to about 10.0 weight percent manganese, and from about 1.0 weight percent to about 2.5 weight percent niobium.

Various advantages of the present invention will become apparent upon reading the following detailed description and appended claims.

DETAILED DESCRIPTION

The present invention is directed toward alloys of the type commonly called CN-12, although the steel may be best classified as CH-12 type steel. For purposes of this disclosure, the disclosed alloys will be referred to as CN-12 type alloys. Table 1 presents the optimal and permissible minimum and maximum ranges for the compositional elements of modified CN-12 stainless steel alloys made in accordance with the present invention. Boron, aluminum and copper may also be added. However, it will be noted that allowable ranges for cobalt, vanadium, tungsten and titanium may not significantly alter the performance of the resulting material. Specifically, based on current information, that cobalt may range from 0 to 5 wt. %, vanadium may range from 0 to 3 wt. %, tungsten may range from 0 to 3 wt. % and titanium may range from 0 to 0.2 wt. % without significantly altering the performances of the alloys. Accordingly, it is anticipated that the inclusion of these elements in amounts that fall outside of the ranges of Table 1 would still provide advantageous alloys and would fall within the spirit and scope of the present invention.

TABLE 1

| Composition by Weight Percent | OPTIMAL | | PERMISSIBLE | |
|---|---|---|---|---|
| Element | CN-12 MIN | CN-12 MAX | CN-12 MIN | CN-12 MAX |
| Chromium | 22.0 | 25.0 | 18.0 | 25.0 |
| Nickel | 12.0 | 16.0 | 12.0 | 20.0 |
| Carbon | 0.30 | 0.45 | 0.2 | 0.5 |
| Silicon | 0.50 | 0.75 | 0.2 | 3.0 |
| Manganese | 2 | 5.0 | 0.5 | 10.0 |
| Phosphorous | 0 | 0.04 | 0 | 0.04 |
| Sulfur | 0 | 0.03 | 0 | 0.10 |

TABLE 1-continued

| Composition by Weight Percent | OPTIMAL | | PERMISSIBLE | |
|---|---|---|---|---|
| Element | CN-12 MIN | CN-12 MAX | CN-12 MIN | CN-12 MAX |
| Molybdenum | 0 | 0.3 | 0 | 0.5 |
| Copper | 0 | 0.3 | 0 | 3.0 |
| Niobium | 1.5 | 2.0 | 1.0 | 2.5 |
| Nitrogen | 0.1 | 0.5 | 0.1 | 0.5 |
| Titanium | 0 | 0.03 | 0 | 0.2 |
| Cobalt | 0 | 0.5 | 0 | 5.0 |
| Aluminum | 0 | 0.05 | 0 | 5.0 |
| Boron | 0 | 0.01 | 0 | 0.01 |
| Vanadium | 0 | 0.01 | 0 | 3.0 |
| Tungsten | 0 | 0.6 | 0 | 3.0 |
| Niobium:Carbon | 3.5 | 5.0 | 3 | 5.0 |
| Carbon + Nitrogen | 0.5 | 0.75 | 0.4 | 1.0 |

Unexpectedly, the inventors have found that substantially reducing the sulfur content of austenitic stainless steels increases the creep properties. The inventors believe machineability is not significantly altered, as they believe the carbide morphology controls machining characteristics in this alloy system. While sulfur may be an important component of cast stainless steels for other applications because it contributes significantly to the machineability of such steels, it severely limits the high temperature creep-life and ductility and low temperature ductility after service at elevated temperatures.

The inventors have found that removing or substantially reducing the presence of sulfur alone provides a four-fold improvement in creep life at 850° C. at a stress load of 110 MPa.

Further, the inventors have found that reducing the maximum carbon content in the alloys of the present invention reduces the coarse NbC and possibly some of the coarse Cr23C6 constituents from the total carbide content (VF Carbide) in a near linear manner as shown in Table 2. Table 2 includes the compositions of eight experimental alloys A-H in comparison with a standard CN-12 type alloy.

TABLE 2

| Composition by Weight Percent | | | | | | | | | |
|---|---|---|---|---|---|---|---|---|---|
| Element | CN-12 | A | B | C | D | E | F | G | H |
| Chromium | 24.53 | 24.87 | 23.84 | 23.92 | 23.84 | 24.28 | 23.9 | 24.00 | 23.96 |
| Nickel | 12.91 | 13.43 | 15.34 | 15.33 | 15.32 | 15.67 | 15.83 | 15.69 | 15.90 |
| Carbon | 0.40 | 0.43 | 0.31 | 0.31 | 0.20 | 0.41 | 0.37 | 0.40 | 0.29 |
| Silicon | 0.9 | 0.82 | 0.7 | 0.7 | 0.68 | 0.66 | 0.66 | 0.66 | 0.66 |
| Manganese | 0.82 | 0.90 | 1.83 | 1.85 | 1.84 | 1.86 | 4.87 | 4.86 | 4.82 |
| Phosphorous | 0.019 | 0.036 | 0.037 | 0.038 | 0.040 | 0.035 | 0.033 | 0.032 | 0.032 |
| Sulfur | 0.139 | 0.002 | 0.002 | 0.003 | 0.003 | 0.001 | 0.001 | 0.001 | 0.001 |
| Molybdenum | 0.49 | 0.26 | 0.52 | 0.52 | 0.52 | 0.31 | 0.31 | 0.30 | 0.30 |
| Copper | 0.15 | 0.01 | 0.01 | 0.01 | 0.00 | 0.01 | 0.01 | 0.01 | 0.01 |
| Niobium | 1.92 | 1.41 | 1.26 | 1.06 | 1.05 | 1.78 | 1.72 | 1.31 | 1.22 |
| Nitrogen | 0.27 | 0.25 | 0.13 | 0.2 | 0.17 | 0.28 | 0.44 | 0.31 | 0.34 |
| Titanium | 0 | 0.005 | 0.004 | 0.005 | 0.004 | 0.004 | 0.005 | 0.006 | 0.005 |
| Cobalt | 0.019 | 0.02 | 0.02 | 0.002 | 0.02 | 0.02 | 0.02 | 0.02 | 0.05 |
| Aluminum | 0 | 0.01 | 0.01 | 0.01 | 0.01 | 0 | 0 | 0 | 0 |
| Boron | 0 | 0.001 | 0.001 | 0.001 | 0.001 | 0 | 0 | 0 | 0 |
| Vanadium | 0 | 0.01 | 0.008 | 0.008 | 0.008 | 0.011 | 0.012 | 0.012 | 0.011 |
| Niobium:Carbon | 4.8 | 3.28 | 4.06 | 3.42 | 5.25 | 4.34 | 4.64 | 3.28 | 4.21 |
| Carbon + Nitrogen | 0.67 | 0.68 | 0.44 | 0.51 | 0.37 | 0.69 | 0.81 | 0.71 | 0.63 |
| $V_F$ Carbide | | 11.4 | 8.0 | 7.5 | 3.7 | | | | |

The volume fraction of carbide shown in Table 2 was measured with a Clemex Image Analysis System. A near linear correlation is observed between carbon content and carbide content. However, by lowering the carbon content below 0.20 wt. %, δ-ferrite is allowed to form. δ-ferrite will eventually form sigma at operating temperatures, presumably causing premature failure. Sigma, is a hard brittle Fe—Cr intermetallic, which greatly reduces both strength and ductility when present. These observations did form the basis for further strategy of designing optimum high temperature microstructures based on smaller specific reductions in as-cast carbide content (mainly CR23C6 rather than NbC) and maximum stability of the austenite matrix against the formation of sigma phase during prolonged aging at 700° C. to 900° C. This improved austenite stability resulted in CN-12 alloys with more nickel, manganese and nitrogen while keeping carbon in the range of 0.30 wt. % to 0.45 wt. %.

The elevated tensile properties for alloys A-H and CN-12 were measured at 850° C. and are displayed in Table 3. Creep properties of alloys A-H and CN-12 were measured at 850° C. and are displayed in Table 4.

TABLE 3

| Alloy | Condition | Temp (° C.) | Strain Rate (l/sec) | YS (ksi) | UTS (ksi) | Elong (%) |
|---|---|---|---|---|---|---|
| CN-12 | As-Cast | 850 | IE-05 | 19.1 | 21.7 | 8.4 |
| A | As-Cast | 850 | IE-05 | 21.2 | 24.5 | 9.6 |
| B | As-Cast | 850 | IE-05 | 19.1 | 20.75 | 14.2 |
| C | As-Cast | 850 | IE-05 | 22.6 | 23.9 | 37.2 |
| D | As-Cast | 850 | IE-05 | 20 | 21.9 | 29.5 |
| E | As-Cast | 850 | IE-05 | 20.8 | 24.8 | 10.8 |
| F | As-Cast | 850 | IE-05 | 24.5 | 27.5 | 6.10 |
| G | As-Cast | 850 | IE-05 | 23.1 | 26.0 | 30.3 |
| H | As-Cast | 850 | IE-05 | 22.9 | 25.8 | 30.0 |

TABLE 4

| Heat | Condition | Temp (° C.) | Stress (ksi) | Life (Hours) | Elong (%) |
|---|---|---|---|---|---|
| CN-12 | As-Cast | 850 | 110 | 10.7 | 6.5 |
| A | As-Cast | 850 | 110 | 53.5 | 6.2 |
| B | As-Cast | 850 | 110 | 51.3 | 37.7 |
| C | As-Cast | 850 | 110 | 26.7 | 26.7 |
| D | As-Cast | 850 | 110 | 17.5 | 25.1 |
| E | As-Cast | 850 | 110 | 93.9 | 11.6 |
| F | As-Cast | 850 | 110 | 113 | 9.6 |
| G | As-Cast | 850 | 110 | 103 | 15.5 |
| H | As-Cast | 850 | 110 | 72.5 | 18 |

The critical testing conditions for CN-12 of 850° C. and 110 MPa were chosen because 850° C. is approximately the highest exhaust temperature observed currently and this is the temperature at which the most harmful precipitates like sigma form rapidly. The stress, 110 MPa, was chosen to provide an accelerated test lasting from 10 to 100 hours that would equate to much longer durability at lower stresses and temperatures during engine service. Removing the sulfur improving the room and elevated temperature ductility, tensile strength, yield strength, creep life and creep ductility for the same carbon content. By lowering the carbon content to 0.30 wt. % creep life and tensile strength were only slightly lowered while creep ductility was improved significantly. By lowering the carbon content further to 0.20 wt. %, room or elevated temperature strength did not decrease significantly, but creep life was reduced by 60 percent.

A solution annealing treatment (SA) was applied to each alloy to analyze the effect of a more uniform distribution of carbon. The alloys were held at 1200° C. for one hour. They were then air cooled rather than quenched to allow the small niobium carbide and chromium carbide precipitates to nucleate in the matrix during cooling. The resulting microstructure was found to be very similar to the as-cast (AS) structure except for the formation of small precipitates. Unfortunately, the solution annealing treatment lowered creep life significantly while increasing creep ductility, therefore proving that the strategy to optimize the as-cast microstructures was best as well as most cost effective.

Alloys A-H and the unmodified CN-12 base alloy were aged at 850° C. for 1,000 hours to study the effects of aging on the microstructure and mechanical properties which are summarized in Table 5. The alloys with 0.3 wt. % carbon (alloys B and C) showed the presence of platelets near the grain boundary structure. The 0.2 wt. % carbon (alloy D) showed an even higher amount of the platelets. The platelets are identified as sigma in the ASM Handbook, Vol. 9, 9th Ed. (1986). SEM/XEDS/TEM analysis confirmed that the platelets had a concentration consistent with sigma. (FeCr). Alloys E, F, and G with more carbon and Nb showed good resistance to sigma phase embrittlement.

TABLE 5

| Alloy | Condition | Temp (° C.) | Strain Rate (l/sec) | YS (ksi) | UTS (ksi) | Elong (%) |
|---|---|---|---|---|---|---|
| CN-12 | Aged 1000 hr at 850° C. | 22 | IE-05 | 42.4 | 79.45 | 5.5 |
| A | Aged 1000 hr at 850° C. | 22 | IE-05 | 46.7 | 76.1 | 3.6 |
| B | Aged 1000 hr at 850° C. | 22 | IE-05 | 37.9 | 58.4 | 2.9 |
| C | Aged 1000 hr at 850° C. | 22 | IE-05 | 46.5 | 81 | 4.6 |
| D | Aged 1000 hr at 850° C. | 22 | IE-05 | 44.4 | 76.4 | 3 |
| E | Aged 1000 hr at 850° C. | 22 | IE-05 | 55.3 | 81.6 | 3.1 |
| F | Aged 1000 hr at 850° C. | 22 | IE-05 | 56 | 84.8 | 2.2 |
| G | Aged 1000 hr at 850° C. | 22 | IE-05 | 53.3 | 85.2 | 2.6 |
| H | Aged 1000 hr at 850° C. | 22 | IE-05 | 43 | 80.7 | 1.7 |

In order to improve upon the performance of alloys A-D, the inventors utilized a unique combination of higher manganese, higher nitrogen, combined with a reduced sulfur content, all in an alloy also containing substantial amounts of carbon and niobium.

Manganese is an effective austenite stabilizer, like nickel, but is about one tenth the cost of nickel. The positive austenite stabilizing potential of manganese must be balanced with its possible affects on oxidation resistance at a given chromium level relative to nickel, which nears maximum effectiveness around 5 wt. % and therefore addition of manganese in excess of 10 wt. % is not recommended. Manganese in an amount of less than 2 wt. % may not provide the desired stabilizing effect. Manganese also dramatically increases the solubility of carbon and nitrogen in austenite. This effect is especially beneficial because dissolved nitrogen is an austenite stabilizer and also improves strength of the alloy when in solid solution without decreasing ductility or toughness. Manganese also improves strength ductility and toughness, and manganese and nitrogen have synergistic effects.

The dramatic reduction in the sulfur content to 0.1 wt. % or less proposed by the present invention substantially eliminates the segregation of free sulfur to grain boundaries and further eliminates MnS particles found in conventional CN-12 alloys, both of which are believed to be detrimental at high temperatures.

With respect to the CN-12 type steel alloys disclosed herein, the inventors have found that an appropriate niobium:carbon ratio reduces excessive and continuous networks of coarse niobium carbides (NbC) or finer chrome carbides ($M_{23}C_6$) along the grain or substructure boundaries (interdentritic boundaries and cast material) that are detrimental to the mechanical performance of the material at high temperatures. Accordingly, by providing an optimum level of the niobium and carbon ratio ranging from about 3 or 3.5 to about 5 for CN-12 alloys, niobium and carbon are present in amounts necessary to provide high-temperature strength (both in the matrix and at the grain boundaries), but without reducing ductility due to cracking along boundaries with continuous or nearly-continuous carbides. Carbon can be present in disclosed CN-12 type alloys in an amount ranging from 0.2 wt. % to about 0.5 wt. % and niobium can be present in CN-12 alloys in an amount ranging from about 1.0 wt. % to about 2.5 wt. %.

Strength at all temperatures is also enhanced by the improved solubility of nitrogen that is a function of manganese. Nitrogen can be present in an amount ranging from 0.1 wt. % to about 0.5 wt. % in CN-12 alloys. The presence of nitride precipitates is reduced by adjusting the levels and enhancing the solubility of nitrogen while lowering the chromium:nickel ratio.

For the disclosed alloys of the CN-12 type, the niobium to carbon ratio may range from about 3 to about 5, the nitrogen content may range from about 0.10 wt. % to about 0.50 wt. %, the carbon content may range from about 0.2 wt. % to about 0.5 wt. %, the niobium content can range from about 1.0 wt. % to about 2.5 wt. %, the silicon content can range from about 0.2 wt. % to about 3.0 wt. %, the chromium content can range from about 18 wt. % to about 25 wt. %, the molybdenum content can be limited to about 0.5 wt. % or less, the manganese content can range from about 0.5 wt. % to about 1.0 wt. %, the sulfur content can range from about 0 wt. % to about 0.1 wt. %, the sum of the carbon and nitrogen content can range from 0.4 wt. % to 1.0 wt. %, and the nickel content can range from about 12 wt. % to about 20 wt. %.

For the disclosed CN-12 type alloys, the phosphorous content can be limited to about 0.04 wt. % or less, the copper content can be limited to about 3.0 wt. % or less, the tungsten content can be limited to about 3.0 wt. % or less, the vanadium content can be limited to about 3.0 wt. % or less, the titanium content can be limited to about 0.20 wt. % or less, the cobalt content can be limited to about 5.0 wt. % or less, the aluminum content can be limited to about 3.0 wt. % or less and the boron content can be limited to about 0.01 wt. % or less.

Because nickel is an expensive component, stainless steel alloys made in accordance with the present invention are more economical if the nickel content is reduced.

INDUSTRIAL APPLICABILITY

The present invention is specifically directed toward a cast stainless steel alloy for the production of articles exposed to high temperatures and extreme thermal cycling such as air/exhaust-handling equipment for diesel and gasoline engines and gas-turbine engine components. However, the present invention is not limited to these applications as other applications will become apparent to those skilled in the art that require an austenitic stainless steel alloy for manufacturing reliable and durable high temperature cast components with any one or more of the following qualities: sufficient tensile and creep strength at temperatures in excess of 600° C.; adequate cyclic oxidation resistance at temperatures at or above 700° C.; sufficient room temperature ductility either as-cast or after exposure; sufficient long term stability of the original microstructure and sufficient long-term resistance to cracking during severe thermal cycling.

By employing the cast stainless steel alloys disclosed herein, manufacturers can provide a more reliable and durable high temperature component. Engine and turbine manufacturers can increase power density by allowing engines and turbines to run at higher temperatures thereby providing possible increased fuel efficiency. Engine manufacturers may also reduce the weight of engines as a result of the increased power density by thinner section designs allowed by increased high temperature strength and oxidation and corrosion resistance compared to conventional high-silicon molybdenum ductile irons. Further, the stainless steel alloys of the present invention provide superior performance over other cast stainless steels for a comparable cost. Finally, stainless steel alloys made in accordance with the present invention will assist manufacturers in meeting emission regulations for diesel, turbine and gasoline engine applications.

While only certain embodiments have been set forth, alternative embodiments and various modifications will be apparent from the above description to those skilled in the art. These and other alternatives are considered equivalents and within the spirit and scope of the present invention.

What is claimed is:

1. A heat resistant and [cast,] corrosion resistant austenitic stainless steel alloy comprising:

from about 0.2 weight percent to a maximum of 0.5 weight percent carbon;

from about 2.0 weight percent to about 10 weight percent manganese;

from about 18.0 weight percent to about 25.0 weight percent chromium;

from about 12.0 weight percent to about 20.0 weight percent nickel; and less than 0.01 weight percent sulfur.

2. The stainless steel alloy of claim 1 further including from about 1.0 weight percent to about 2.5 weight percent niobium.

3. The stainless steel alloy of claim 2 wherein niobium and carbon are present in a weight ratio of niobium to carbon ranging from about 3 to about 5.

4. The stainless steel alloy of claim 1 further including from about 0.10 weight percent to about 0.5 weight percent nitrogen.

5. The stainless steel alloy of claim 1 further including less than about 0.04 weight percent phosphorous.

6. The stainless steel alloy of claim 1 further including about 0.5 weight percent molybdenum or less.

7. The stainless steel alloy of claim 1 further including about 3.0 weight percent copper or less.

8. The stainless steel alloy of claim 1 further including from about 0.75 weight percent silicon or less.

9. The stainless steel alloy of claim 1 further including from about 0.2 weight percent titanium or less.

10. The stainless steel alloy of claim 1 further including from about 5.0 weight percent cobalt or less.

11. The stainless steel alloy of claim 1 further including from about 3.0 weight percent aluminum or less.

12. The stainless steel alloy of claim 1 further including from about 0.01 weight percent boron or less.

13. The stainless steel alloy of claim 1 further including from about 3.0 weight percent tungsten or less.

14. The stainless steel alloy of claim 2 further including about 3.0 weight percent vanadium or less.

15. The stainless steel alloy of claim 1 wherein nitrogen and carbon are present in a cumulative amount ranging from 0.4 weight percent to 1.0 weight percent.

16. An article formed from the heat resistant and [cast,] corrosion resistant austenitic stainless steel alloy of claim 1.

17. A heat resistant and [cast,] corrosion resistant austenitic stainless steel alloy comprising:

from about 18.0 weight percent to about 25.0 weight percent chromium and about 12.0 weight percent to about 20.0 weight percent nickel;

from about 0.2 weight percent to about 0.5 weight percent carbon;

from about 2.0 weight percent to about 10.0 weight percent manganese;

less than 0.01 weight percent sulfur; and from about 1.0 weight percent to about 2.5 weight percent niobium.

18. The heat resistant and [cast,] corrosion resistant austenitic stainless steel alloy of claim 17 wherein the chromium content is from about 23.0 weight percent to about 25.0 weight percent chromium and the nickel content is from about 13.0 weight percent to about 16.0 weight percent nickel.

19. The heat resistant and [cast,] corrosion resistant austenitic stainless steel alloy of claim 17 wherein the carbon content is from about 0.30 weight percent to about 0.45 weight percent carbon.

20. The heat resistant and [cast,] corrosion resistant austenitic stainless steel alloy of claim 17 wherein the manganese content is from about 2.0 weight percent to about 6.0 weight percent manganese.

21. The heat resistant and [cast,] corrosion resistant austenitic stainless steel alloy of claim 17 wherein the manganese content is from about 4.0 weight percent to about 6.0 weight percent manganese.

22. The heat resistant and [cast,] corrosion resistant austenitic stainless steel alloy of claim 17 wherein the niobium content is from about 1.5 weight percent to about 2.0 weight percent niobium.

23. The heat resistant and [cast,] corrosion resistant austenitic stainless steel alloy of claim 17 wherein niobium and carbon are present in a weight ratio of niobium to carbon ranging from about 3 to about 5.

24. The heat resistant and [cast,] corrosion resistant austenitic stainless steel alloy of claim 17 wherein the alloy is fully austenitic with any carbide formation being substantially niobium carbide.

25. The heat resistant and [cast,] corrosion resistant austenitic stainless steel alloy of claim 17 wherein the alloy is substantially free of manganese sulfides.

26. The heat resistant and [cast,] corrosion resistant austenitic stainless steel alloy of claim 17 wherein the alloy is substantially free of chrome carbides along grain and substructure boundaries.

27. The heat resistant and [cast,] corrosion resistant austenitic stainless steel alloy of claim 17 wherein the alloy is substantially free of sigma phase of Fe—Cr.

* * * * *